United States Patent
Hecht et al.

(10) Patent No.: US 10,682,752 B2
(45) Date of Patent: Jun. 16, 2020

(54) HANDHELD POWER TOOL

(71) Applicant: Robert Bosch GmbH, Stuttgart (DE)

(72) Inventors: Joachim Hecht, Magstadt (DE); Michael Hopp, Leonberg-Hoefingen (DE)

(73) Assignee: Robert Bosch GmbH, Stuttgart (DE)

( * ) Notice: Subject to any disclaimer, the term of this patent is extended or adjusted under 35 U.S.C. 154(b) by 150 days.

(21) Appl. No.: 15/763,514

(22) PCT Filed: Oct. 14, 2016

(86) PCT No.: PCT/EP2016/074653
§ 371 (c)(1),
(2) Date: Mar. 27, 2018

(87) PCT Pub. No.: WO2017/064225
PCT Pub. Date: Apr. 20, 2017

(65) Prior Publication Data
US 2018/0272516 A1 Sep. 27, 2018

(30) Foreign Application Priority Data

Oct. 15, 2015 (DE) .......... 10 2015 220 041
Oct. 13, 2016 (DE) .......... 10 2016 220 001

(51) Int. Cl.
*B25F 5/00* (2006.01)
*B25B 23/14* (2006.01)
(Continued)

(52) U.S. Cl.
CPC ............ *B25F 5/001* (2013.01); *B25B 23/141* (2013.01); *B25B 23/147* (2013.01); *F16D 7/005* (2013.01);
(Continued)

(58) Field of Classification Search
CPC .... B25F 5/001; B25F 5/00; B25F 5/02; B25B 23/14; B25B 23/141; B25B 23/147;
(Continued)

(56) References Cited

U.S. PATENT DOCUMENTS 5,738,177 A * 4/1998 Schell ............... B25B 23/14
173/178
7,506,694 B2 * 3/2009 Stirm ............... B25F 5/00
173/176
(Continued)

FOREIGN PATENT DOCUMENTS

CN 102642194 A 8/2012
CN 104661796 A 5/2015
(Continued)

OTHER PUBLICATIONS

International Search Report dated 9 Feb. 2017, of the corresponding International Application PCT/EP2016/074653 filed Oct. 14, 2016.

*Primary Examiner* — Hemant Desai
*Assistant Examiner* — Jacob A Smith
(74) *Attorney, Agent, or Firm* — Norton Rose Fulbright US LLP; Gerard Messina (57) ABSTRACT

A handheld power tool includes a torque coupling adjustable by the operator, as well as a gear unit for transmitting a torque generated by a drive motor to a drive shaft. The gear unit is advantageously a planetary gear unit; the torque coupling being constructed in such a manner, that in response to slippage of the torque coupling, a coupling component follows a displacement path. The handheld power tool further includes a control unit and a sensor, the sensor monitoring the coupling component for a displacement and transmitting corresponding sensor signals to the control unit. The control unit is configured to control, in particular, switch off, the drive motor as a function of the sensor signals received. It is further provided that the control unit subject the received sensor signals to a plausibility check, in order to determine if actual slippage of the torque coupling is occurring.

15 Claims, 4 Drawing Sheets (51) Int. Cl.
*B25B 23/147* (2006.01)
*F16D 7/00* (2006.01)
*F16D 43/02* (2006.01)
*B25B 21/00* (2006.01)

(52) U.S. Cl.
CPC .............. F16D 43/02 (2013.01); *B25B 21/00* (2013.01); *F16D 2300/18* (2013.01)

(58) Field of Classification Search
CPC ......... B25B 21/00; F16D 43/02; F16D 7/005; F16D 2300/18
USPC .............. 173/2, 32, 170, 171, 176, 216, 217
See application file for complete search history.

(56) References Cited

U.S. PATENT DOCUMENTS

| | | | | |
|---|---|---|---|---|
| 7,886,841 | B2* | 2/2011 | Armstrong | B25D 16/003 173/109 |
| 2004/0182588 | A1* | 9/2004 | Tokunaga | B25B 21/02 173/2 |
| 2009/0008115 | A1* | 1/2009 | Guo | B25D 16/003 173/176 |
| 2009/0071671 | A1* | 3/2009 | Zhong | B23B 45/008 173/176 |
| 2011/0127059 | A1* | 6/2011 | Limberg | F16D 7/044 173/216 |
| 2011/0315414 | A1* | 12/2011 | Kuntner | B23P 19/066 173/1 |
| 2013/0284477 | A1* | 10/2013 | Braun | B23Q 5/58 173/176 |

FOREIGN PATENT DOCUMENTS

| | | | |
|---|---|---|---|
| CN | 105666427 A | 6/2016 | |
| CN | 106457541 A | 2/2017 | |
| DE | 19737234 A1 | 3/1999 | |
| DE | 69636857 T2 | 10/2007 | |
| DE | 102011004495 A1 | 8/2012 | |
| DE | 102012204172 A1 | 9/2013 | |
| DE | 102013221697 A1 | 4/2015 | |
| EP | 1157791 A2 | 11/2001 | |
| EP | 1157791 B1 * | 11/2001 | ........... B25B 23/147 |

* cited by examiner

HANDHELD POWER TOOL

FIELD

The present invention relates to a handheld power tool, in particular, a screwdriver, a drill/driver or a cordless drill/driver, including a rotatable tool support, which may be driven via a gear unit.

BACKGROUND INFORMATION

Handheld power tools having a gear unit, in particular, a planetary gear unit, such as a straight screwdriver, a cordless drill/driver or a drill, include, generally, a safety coupling adjustable by the operator, so that the handheld power tool does not continue to rotate uncontrollably in response to a predetermined torque being exceeded. Thus, German Patent Application No. DE 197 37 234 A1 describes a tool having a rotatable tool support, the tool support being drivable by a drive motor via a planetary gear unit, and the ring gear of the planetary gear unit interacting with the gear housing via a slip clutch in such a manner, that a pressure plate moves away from the clutch upon the reaching of an adjustable torque, which means that a movement of the ring gear relative to the gear housing triggers a movement of the ring gear relative to the gear housing.

In addition, conventional handheld power tools may include mechanical and/or electrical switches to detect the relative movement of the ring gear, may generate an electrical signal, and disconnect the current supply to the motor.

A disadvantage is that due to the elasticity of the component parts used, in response to unfavorable working situations in which loads and vibrations suddenly occur, electrical signals are generated, and the current supply to the motor is interrupted, although no relative movement of the ring gear has occurred.

SUMMARY

An object of the present invention is to provide a handheld power tool which allows reliable detection of a relative movement of the ring gear upon the reaching of a torque set beforehand by an operator, and which, in this context, may be assembled as simply as possible and is inexpensive.

Advantageous embodiments, variants and further refinements of the present invention are described herein.

Such a handheld power tool includes a torque coupling, in particular, a torque coupling adjustable by the operator, as well as a gear unit for transmitting a torque generated by a drive motor to a drive shaft. The gear unit is advantageously a planetary gear unit; the torque coupling being constructed in such a manner, that in response to slippage of the torque coupling, a coupling component follows an, in particular, axial displacement path. The handheld power tool further includes a control unit and a sensor, the sensor monitoring the coupling component for an, in particular, axial displacement and transmitting corresponding sensor signals to the control unit. The control unit is configured to control, in particular, switch off, the drive motor as a function of sensor signals received. It is further provided that the control unit subject the received sensor signals to a plausibility check, in order to determine if actual slippage of the torque coupling is occurring. Consequently, it may be ensured that the current supply to the drive motor even continues during unfavorable working situations, such as suddenly occurring loads and vibrations.

The coupling component is advantageously a pressure plate, the pressure plate moving in the axial direction to release the torque coupling. The relative axial movement of the pressure plate produces a relative axial movement between a switching element and the associated sensor, in particular, an optical sensor; the switching element preferably taking the form of a separate component part and being axially secured on the pressure plate with little play, in such a manner, that it carries out the same relative axial movement as the pressure plate. In this manner, secure and reliable monitoring of the torque limitation may be ensured without repeated slippage of the torque coupling. The use of an optical sensor and a switching element saves space, which means that the overall length and overall width of the handheld power tool does not have to be changed.

The control unit advantageously assigns control signals to the sensor signals received from the sensor. The sensor signals are assigned either to a first control signal or to a second control signal. In this context, the first control signal indicates that no movement of the coupling component has taken place. On the other hand, the second control signal indicates that a movement of the coupling component has taken place. The distinction between the first control signal and the second control signal is made, for example, in light of a limiting value or a limiting value range for the sensor signals.

The control unit advantageously establishes a first condition for actual slippage of the torque coupling and/or a second condition for actual slippage of the torque coupling, in response to an n-time change between the first control signal and the second control signal within a maximum permissible time tmax determined beforehand and/or within a minimum permissible time tmin determined beforehand, respectively. Since, for example, a change between the first control signal and the second control signal may occur without actual slippage of the torque coupling occurring, at least two, in particular, three signal changes, alternatively, even greater than three signal changes, are necessary for unequivocal detection of actual slippage of the torque coupling. Consequently, the control unit detects actual slippage of the torque coupling, if either the first condition and/or the second condition for actual slippage of the torque coupling are satisfied. In this manner, it may be prevented that the current supply to the drive motor continues and is not interrupted in response to erroneously and/or inadequately transmitted signal changes.

In the embodiment variant already described, the sensor detects the specific relative axial movement of the switching element and/or the pressure plate, and the control unit controls and/or switches off the drive motor in accordance with a detected, actual slippage. In order to ensure this, it is advantageous for the switching element to extend past a clearance seal, into an enclosed region of the sensor; the sensor being accommodated in a recess of the coupling housing in a low-tolerance and/or as play-free a manner as possible. Due to the clearance seal, it is possible for the enclosed region to be sealed with respect to the coupling housing, and for the sensor to be protected from grime. According to the present invention, the control unit is configured to control, in particular, switch off the drive motor, as soon as actual slippage of the torque coupling is detected at a torque set beforehand by the operator.

Consequently, the required time, in which a predetermined number of signal changes between the first control signal and the second control signal may occur during the slippage of the torque coupling, is a further criterion for the occurrence of actual slippage. In one particularly advantageous refinement, the control unit is configured to determine minimum permissible time tmin or maximum permissible time tmax as a function of motor speed n. Permissible time t is derived, in principle, from motor speed n and the distance from one stop notch to the next stop notch, which means that a linear relationship results between motor speed n and minimum permissible time tmin. However, generally, motor speed n during operation may not be determined up to 100 percent correctly, so that in a particularly preferred specific embodiment, a safety allowance is added to permissible time t. Therefore, a nonlinear relationship between motor speed n and minimum permissible time tmin or maximum permissible time tmax is advantageously taken as a basis.

It is practical for maximum permissible time tmax to cover a range of at least two, in particular, three stop notches; it being advantageous for the number of stop notches over the entire speed range to be as small as possible. In one particularly advantageous refinement of the present invention, maximum permissible time tmax may be determined according to the following formula:

$$t\max = a*b*I\_Notch\_speed x/n\_motor$$

where:
- a=number of stop notches up to controlling, in particular, switching off the drive motor;
- b=number of stop notches on the coupling component, in particular, the ring gear;
- I_Notch_Speed=gear ratio of the drive motor with respect to an individual stop notch, in the case of a blocked drive shaft; and
- x=gear speed.

In this manner, the number of stop notches may be fixedly determined beforehand.

The control unit preferably includes a time generator; in response to a first signal change, the time generator emitting a start signal and starting a time measurement, and the control unit aborting the time measurement if two further signal changes are not detected within maximum permissible time tmax. Alternatively, it is provided that the time generator start a new time measurement in response to each signal change, the control unit monitoring each time measurement separately with regard to whether two signal changes occur within, in each instance, maximum permissible time tmax.

In a particularly advantageous manner, the handheld power tool includes a further sensor for detecting a gear speed x; in one refinement of the present invention, the control unit being configured to determine minimum permissible time tmin or maximum permissible time tmax as a function of motor speed n and gear speed x. Stipulated values for minimum permissible time tmin or maximum permissible time tmax are preferably stored in the control unit as a function of motor speed n and gear speed x.

An optical sensor, in particular, a photoelectric barrier, especially, a photoelectric reader, is particularly advantageous as a sensor, since a relative movement of the switching element may be detected by it in a simple and rapid manner.

In one preferred specific embodiment, the handheld power tool is a cordless screwdriver, a drill, an impact drill or a hammer drill; a drill bit, a core bit or different bit attachments being able to be used as a tool. In general, a handheld power tool is to be understood as all handheld power tools including a rotatable tool support, which may be driven by a drive motor via a planetary gear unit, such as straight screwdrivers, cordless drills, impact drills, multifunctional tools, and/or drill/drivers. In this connection, transmission of electrical energy is to be understood to mean that the handheld power tool transmits energy to the body via a storage battery and/or via an electrical cable connection.

Further features, uses, and advantages of the present invention are derived from the following description of the exemplary embodiment according to the present invention, which is shown in the figures. In this context, it should be noted that the features described or represented in the figures—either alone or in any combination, are the subject manner of the present invention, irrespective of their combination, wording and representation herein and in the figures, respectively, —have only a descriptive character, and—are not intended to limit the present invention in any form.

BRIEF DESCRIPTION OF THE DRAWINGS

Below, the present invention is explained in further detail, in light of exemplary embodiments represented in the figures.

DETAILED DESCRIPTION OF EXAMPLE EMBODIMENTS

Figure 1:
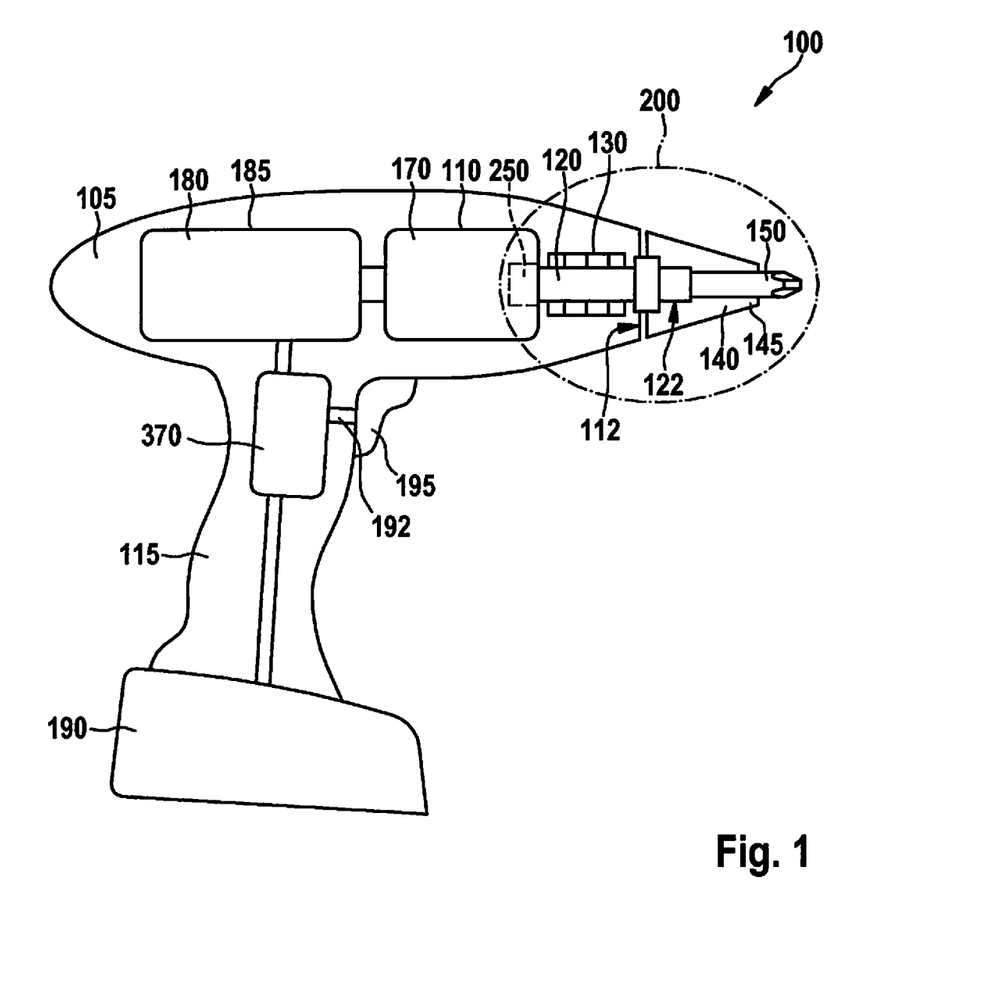
FIG. 1 shows, by way of example, a schematic view of a handheld power tool of the present invention, according to a first specific embodiment.

FIG. 1 shows a handheld power tool 100 of the present invention, which includes a housing 105 having a handle 115. According to the specific embodiment depicted, handheld power tool 100 is mechanically and electrically connectible to a battery pack 190, in order to supply power independently of an electrical network. In FIG. 1, handheld power tool 100 illustratively takes the form of a cordless drill/driver. However, it is emphasized that the present invention is not limited to cordless drill/drivers, but on the contrary, may be applicable to different handheld power tools, in which a tool is set into rotation, for example, to a cordless drill, a cordless impact drill, or a straight screwdriver or an impact drill, etc.

An electric drive motor 180 powered by current from battery pack 190, and a gear unit 170, are situated in housing 105. Drive motor 180 is connected to a drive shaft 120 via gear unit 170. For the purpose of illustration, drive motor 180 is situated in a motor housing 185, and gear unit 170 is situated in a gear housing 110; gear housing 110 and motor housing 185 only being situated in housing 105 for purposes of illustration. In addition, in order to control and/or regulate drive motor 180 and gear unit 170, a control unit 370 is situated inside housing 105, the control unit influencing the drive motor and the gear unit, for example, using a set motor speed n, a selected torque, a desired gear speed x, or the like.

According to one specific embodiment, gear unit 170 is a planetary gear unit, which is configured with a plurality of gear speeds x, and to which a torque coupling 251 is attached. During operation of handheld power tool 100, planetary gear unit 170 is driven to rotate by drive motor 180. In the following, planetary gear unit 170 is described in detail, with reference to a schematic sectional view of a detail 200 represented in enlarged form in FIG. 2.

For example, drive motor 180 is operable, that is, capable of being switched on and off, via a manual switch 195, and may be any type of motor, for example, an electronically commutated motor or a direct current motor. Preferably, drive motor 180 may be controlled and/or regulated in such a manner, that both reversing operation and setpoint entries regarding desired motor speed n are feasible. The method of functioning and the construction of a suitable drive motor are sufficiently known from the related art, so that in this case, a detailed description is omitted for the purpose of conciseness.

Drive shaft 120 is rotationally mounted in housing 105 via a bearing layout 130 and is provided with a tool fixture 140, which is situated in the region of an end face 112 of housing 105 and includes, for example, a drill chuck 145. In this connection, bearing layout 130 may be attached to housing 105, for example, by associated mounting elements, or may be situated in an associated intermediate element, for example, gear housing 110 or motor housing 185. Tool fixture 140 is used for holding a tool 150 and may be molded onto drive shaft 120 or connected to it in the form of a fixture. In FIG. 1, tool fixture 140 is formed, for example, as a fixture and is attached to drive shaft 120 via a mounting device 122 provided on it.

Figure 2:
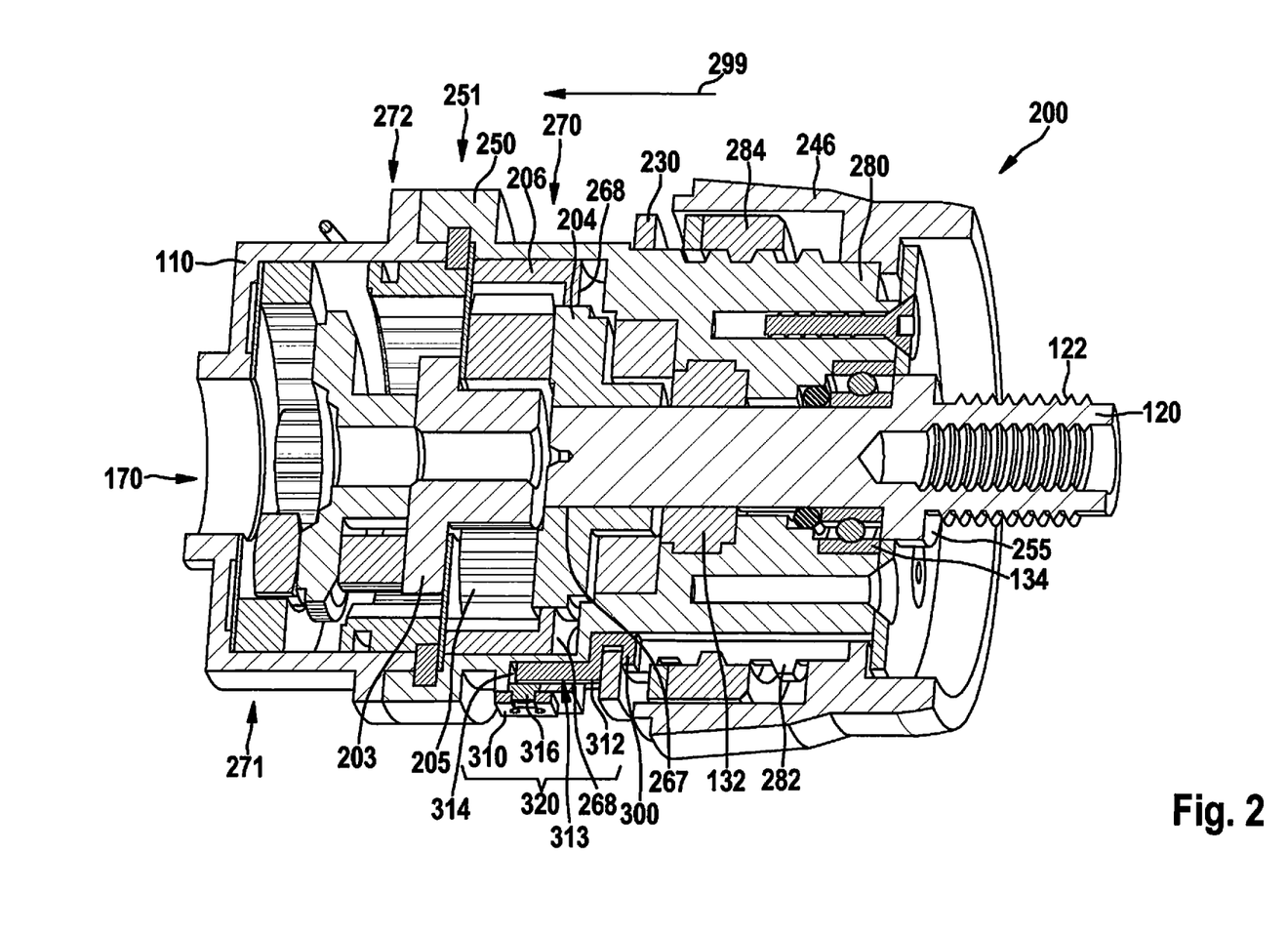
FIG. 2 shows an enlarged sectional view of a detail of the handheld power tool from FIG. 1.

FIG. 2 depicts detail 200 of handheld power tool 100 from FIG. 1, where, for the purpose of clarity and simplicity of the figure, a representation of tool 150 and tool fixture 140 from FIG. 1 is omitted. Detail 200 clearly shows an exemplary embodiment of planetary gear unit 170, bearing layout 130, drive shaft 120, as well as torque coupling 251.

Planetary gear unit 170 includes, for example, three gear speeds x or planetary stages situated in gear housing 110: a front stage 270, a rear stage 271 and a middle stage 272. Front planetary stage 270 includes, for example, a sun gear 203 having gear teeth, at least one planet gear 205 having gear teeth, and a planet carrier or tool support 204 having a rotational driving contour 267, and the front planetary stage is encompassed by a ring gear 206.

Torque coupling 251 takes the form of a so-called slip clutch, which may be acted upon by a variable prestress force with the aid of an adjustable set nut 284. A torque may be set via this adjustable slip clutch, a predetermined contact pressure being applied to coupling component 230 by, for example, compression springs, in the direction of an arrow 299. Coupling component 230 acts upon a plurality of pressure elements 236, which are, in the exemplary embodiment shown, thrust balls that protrude through openings in coupling housing 250 and against an end face 268 of ring gear 206 with the contact pressure; the end face facing coupling component 230 and therefore facing away illustratively from the drive motor 180 of FIG. 1. In the case of disengagement of the slip clutch, ring gear 206 undergoes rotation relative to gear housing 250. Both tool support 204 and ring gear 206 rotate both during normal operation and during the disengagement of the slip clutch.

Since the construction of a planetary gear unit is sufficiently conventional to one skilled in the art, a further description of planetary stages 271, 272 is omitted for the purpose of conciseness of the description. The torque of the drive motor 180 from FIG. 1 is transmitted via planetary stages 271, 272, 270 to drive shaft 120, with the aid of rotational driving contour 267 of tool support 204.

Drive shaft 120 includes mounting device 122, which illustratively takes the form of an external thread, and to which drill chuck 145 of tool fixture 140 of FIG. 1 may be attached; the external thread being able to be brought into thread engagement with, for example, an internal thread provided on drill chuck 145. According to one specific embodiment, drive shaft 120 takes the form of a driving spindle having a support flange 255, which means that bearings 132, 134 of bearing layout 130 are used as a spindle bearing. According to the one specific embodiment depicted, bearing layout 130 includes a first bearing 134 and a second bearing 132 set apart from it; first bearing 134 taking the form of, e.g., a ball bearing, and second bearing 132 taking the form of, e.g., a journal bearing. However, it should be pointed out that other types of bearings may also be used within the scope of the present invention. Thus, as an alternative, bearings 132, 134 may each be implemented as a ball bearing, journal bearing, needle bushing, roller bearing, or other types of rolling-contact bearings. Bearings 132, 134 are situated in a bearing sleeve or bushing 280, which is provided with an external thread 282, and on which, for example, an adjusting ring 246 is rotationally mounted. This is in active engagement with a set nut 284, which is rotationally mounted on external thread 282 of bearing sleeve 280.

However, coupling component 230 and pressure elements 236 are shown as a pressure plate and as thrust balls only by way of example and are not used to limit the present invention to a use of such pressure plates as a coupling component 230 and thrust balls as pressure elements 236. On the contrary, coupling component 230 and pressure elements 236 may also be implemented in alternative specific embodiments, provided that the predetermined contact pressure may be applied to these via end face 268 of ring gear 206. A stop surface 231 corresponding to the number of pressure elements 236 is formed on end face 268 of ring gear 206; for example, the stop surfaces being formed at the thrust balls as indentations. In the specific embodiment depicted, stop surface 231 is formed in the shape of a section of a sphere. However, it is emphasized that arbitrary embodiments of stop surface 231 and pressure element 236 are possible, as long as the functionality of torque coupling 251 described below is attainable by them.

In addition, it should be pointed out that the construction and the mode of operation of a planetary gear unit, as well as the interaction with the depicted coupling, in order to set a torque, are conventional, so that this will not be discussed in any more detail herein.

As shown in FIG. 2, the torque coupling 251 formed by pressure elements 236, ring gear 206, pressure plate 230, and set nut 284 and/or adjusting ring 246 is situated in the region of front planetary stage 270. However, this is merely illustrative and not to be understood as a limitation of the present invention. On the contrary, torque coupling 251 may be formed in conjunction with any planetary stage.

During operation of handheld power tool 100 of FIG. 1, pressure elements 236, together with stop surface 231 of ring gear 206 and coupling component 230, are used, in the case of rotation of drive shaft 120, to lock stop surface 231 of ring gear 206 until a predetermined torque is reached, which means that ring gear 206 is rigidly coupled to coupling housing 250 and rotational driving contour 267 of tool support 204 via coupling component 230, that is, these are not rotatable relative to one another. To this end, pressure elements 236 are initially pushed by coupling component 230, via the force of compression springs, in the direction of arrow 299, against ring gear 206, with a predefined contact pressure, and held in a corresponding coupling and/or locking position, in which pressure elements 236 lock in stop surface 231 at end face 268 of ring gear 206.

In this connection, the contact pressure of coupling component 230 is adjustable by rotating the adjusting ring 246 and, consequently, set nut 284; set nut 284 preferably being adjustable, that is, rotatable, in such a manner, that it may prevent and/or block an axial displacement of coupling component 230 completely, that is, as a function of torque, in a so-called "coupling." As an alternative to this, a suitable locking element may be used for limiting an axial displacement of coupling component 230, in order to lock this in the drilling position.

In the coupling mode of torque coupling 251, gear-tooth friction forces act between the gear teeth, and/or bearing friction forces of planet gears 205 act; the gear-teeth friction forces and bearing friction forces being a function of a torque transmitted to drive shaft 120. These friction forces act against an axial movement of coupling component 230 and consequently act in a supporting manner for compression springs, which means that these may be sized to have comparatively low elastic forces. This, in turn, allows adjusting ring 246 to lock in at bearing sleeve 280 in a comparatively weaker manner, since a corresponding restoring tendency of set nut 284 may at least be reduced by the low elastic forces of compression springs. Consequently, relatively low manipulating forces are required when operating adjusting ring 246.

When predetermined torque is reached, pressure elements 236 and the indentations of stop surface 231 at end face 268 of ring gear 206 cause an axial displacement of coupling component 230 in opposition to the above-mentioned friction forces and the elastic forces of compression springs, in order to release torque coupling 251; pressure elements 236 being displaced over the associated indentations of stop surface 231 in the manner of movement of a ratchet. Consequently, the coupling between ring gear 206 and coupling housing 250 of torque coupling 251 is removed, so that a rotation of ring gear 206 in gear housing 110 relative to tool support 204 is enabled.

In addition, FIG. 2 shows a switching element 300 and a sensor 310, which is assigned to the switching element and, in the exemplary embodiment depicted, is implemented in the form of an optical sensor 310 including a photoelectric barrier, in particular, a photoelectric reader. Switching element 300 engages axially with essentially annular coupling component 230 with little play, such that the relative axial movement of coupling component 230 produces the same relative axial movement between switching element 300 and associated sensor 310. In this context, coupling component 230 and switching element 300 are linked by a connecting segment, which lies in a radial direction inwards from coupling component 230 and, in the specific embodiment depicted in FIG. 2, is implemented in the form of a nose. Furthermore, coupling housing 250 includes a groove-shaped recess 313, which is shaped in such a manner, that guidance of switching element 300, which is as free of play as possible, may be ensured. In this manner, switching element 300 may transmit the relative axial movement of coupling component 230, which means that sensor 310 may detect any relative axial movement of switching element 300 and coupling component 230 reliably and accurately. Sensor 310 is configured to transmit sensor signals to control unit 370. Control unit 370 is configured to receive the sensor signals of sensor 310. Control unit 370 is also configured to assign control signals to the sensor signals received from sensor 310. Control unit 370 assigns a sensor signal a first control signal 351, which represents a lack of movement of coupling component 230, or a second control signal 352, which represents a movement of coupling component 230. The assignment of the sensor signals to one of the two control signals, thus, to the first control signal or to the second control signal, is made in light of a limiting value or a limiting value range, which is defined for the sensor signals.

Coupling housing 250 also includes a recess, which ensures that sensor 310 is received in a manner as free of play as possible. In this context, sensor 310 is connected to control unit 370 of drive motor 180 by a plate, which is attached to coupling housing 250 on the outside, in a radial direction; the control unit not being shown in FIG. 2. Starting from plate 316, sensor 310 extends inwardly in a radial direction, into the recess of coupling housing 250; plate 316 fitting on coupling housing 250 in such a manner, that sensor 310 is sealed as extensively as possible with respect to coupling housing 250 and forms an enclosed region 314.

Switching element 300 extends across groove-shaped recess 313 in coupling housing 250, into enclosed region 314 of sensor 310; enclosed region 314 being sealed by a clearance seal 312 in such a manner, that sensor 310 is optimally protected from grime. When the predetermined torque is reached, the relative axial movement of coupling component 230 causes sensor 310 to detect it. As a function of the relative axial movement, sensor 310 transmits corresponding sensor signals to control unit 370. Control unit 370 subjects the transmitted sensor signals of sensor 310 to a plausibility check, with the aid of which control unit 370 determines whether or not actual slippage of torque coupling 251 has occurred and controls drive motor 180 as a function of the received sensor signals.

Control unit 370 assigns control signals to the sensor signals received from sensor 310. Control unit 370 assigns a first control signal 351 or a second control signal 352 to a sensor signal, depending on whether or not a movement of coupling component 230 has occurred. First control signal 351 represents a lack of movement of coupling component 230, while second control signal 352 represents, in particular, a movement of coupling component 230.

Control unit 370 further includes a time generator not depicted in detail; in response to a first signal change 341, the time generator emitting a start signal and starting a time measurement. If two further signal changes 342, 343 are not detected within maximum permissible time tmax, control unit 370 aborts the time measurement. Alternatively, it is provided that the time generator start a new time measurement in response to each signal change 341, 342, 343. In this case, control unit 370 monitors each time measurement separately with regard to whether two further signal changes 341, 342, 343 occur within, in each instance, maximum permissible time tmax.

Handheld power tool 100 may also include a further sensor for detecting a gear speed x. Accordingly, control unit 370 is also configured to determine minimum permissible time tmin or maximum permissible time tmax as a function of motor speed n and gear speed x; alternatively or additionally, values for minimum permissible time tmin or maximum permissible time tmax already being able to be stored in control unit 370 as a function of motor speed n and gear speed x.

Figure 3:
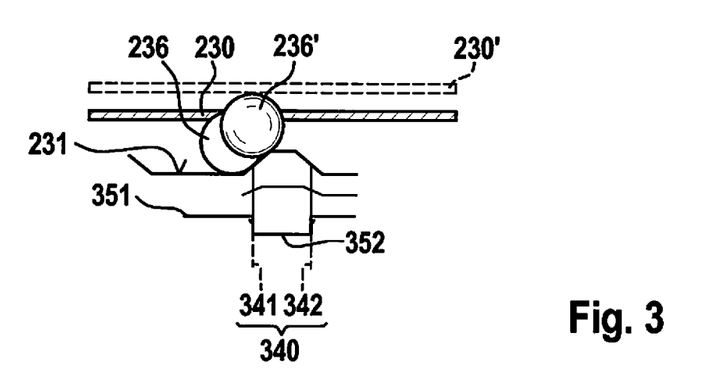
FIG. 3 shows a schematic view of a possible, first slippage characteristic on the basis of two signal changes.
Figure 4:
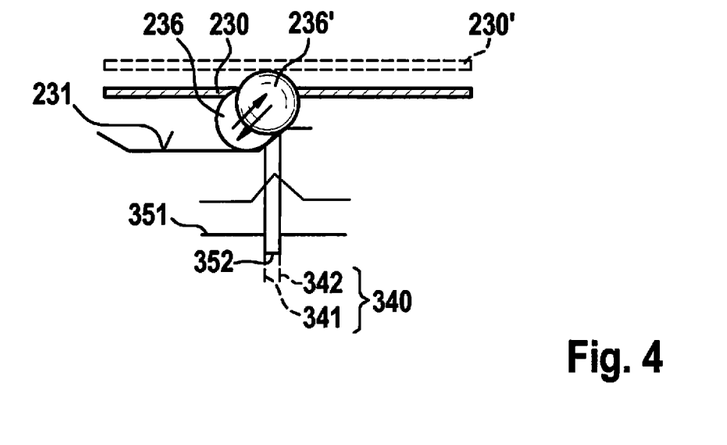
FIG. 4 shows a schematic view of a falsely detected slippage characteristic on the basis of two signal changes.
Figure 5:
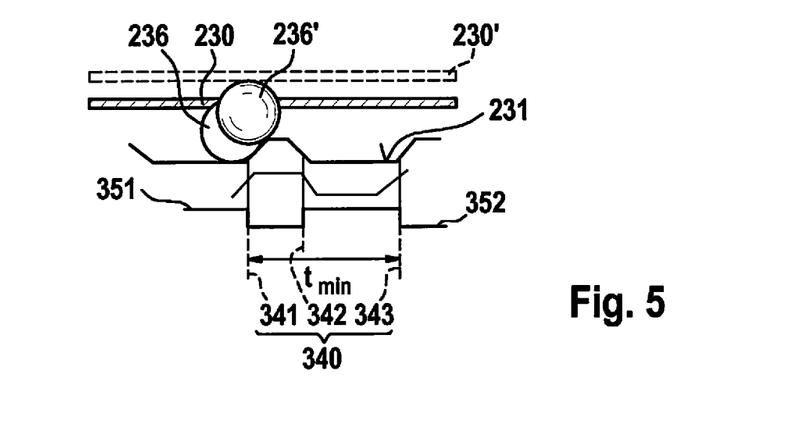
FIG. 5 shows a schematic view of an actual slippage characteristic on the basis of two signal changes.

Possible slippage of coupling 251 at a torque determined beforehand is represented in FIG. 3; starting from the coupling position, in an axial displacement, pressure elements 236 moving coupling component 230 in opposition to the above-mentioned friction forces and the elastic forces of compression springs, into a slippage position 230', 236'. In the two positions, both tool support 204 and ring gear 206 rotate. In this instance, pressure elements 236 are moved over the associated indentations of stop surface 231. Consequently, the coupling between ring gear 206 and coupling housing 250 of torque coupling 251 is removed, so that a rotation of ring gear 206 in gear housing 110 relative to tool support 204 is enabled. In the slippage variant depicted, a first signal change 341 and a second signal change 342 between first control signal 351 and second control signal 352 take place. In this context, whether actual slippage of torque coupling 251, as represented in FIG. 5, is occurring, or whether, as depicted clearly in FIG. 4, first signal change 341 and second signal change 342 occur between first control signal 351 and second control signal 352 without actual slippage of torque coupling 251 being present, may not be determined reliably with the aid of only one, in particular, two signal changes 341, 342. To unequivocally detect actual slippage of torque coupling 251, as depicted in FIG. 5, at least two, preferably three, signal changes 341, 342, 343 are necessary. In this context, it is provided that control unit 370 detect first signal change 341, second signal change 342, and a third signal change 343 between first control signal 351 and second control signal 352, within a minimum permissible time tmin determined beforehand; the number of signal changes 341, 342, 343 also being able to be greater than 3. In general, in the event of a two-time, in particular, three-time signal change 341, 342, 343 or a greater than three-time signal change 341, 342, 343 between first control signal 351 and second control signal 352 within a maximum permissible time tmax determined beforehand, and, alternatively or additionally, within a minimum permissible time tmin determined beforehand, it is provided that control unit 370 establish a first condition and a second condition, respectively, for actual slippage of torque coupling 251. Control unit 370 is configured in such a manner, that it switches off drive motor 180 in response to detecting the first condition and/or the second condition.

Figure 6:
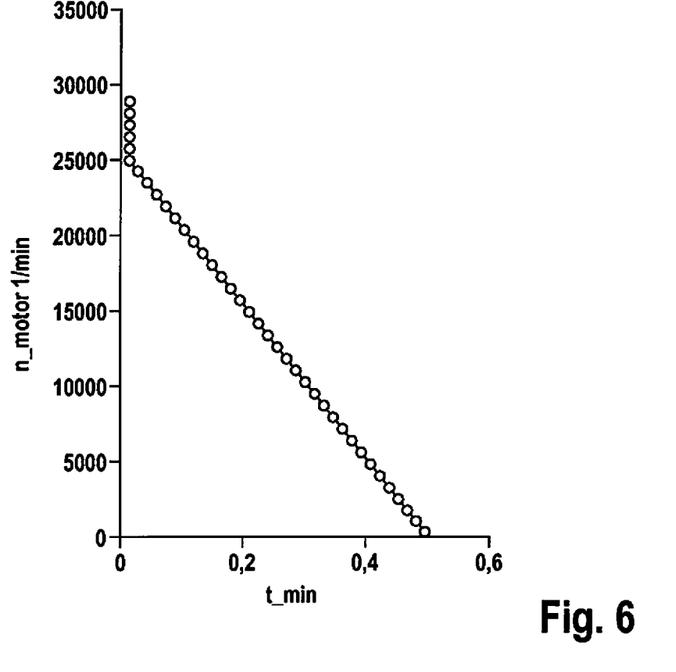
FIG. 6 shows an illustration of a linear temporal relationship between motor speed n and minimum permissible time tmin.
Figure 7:
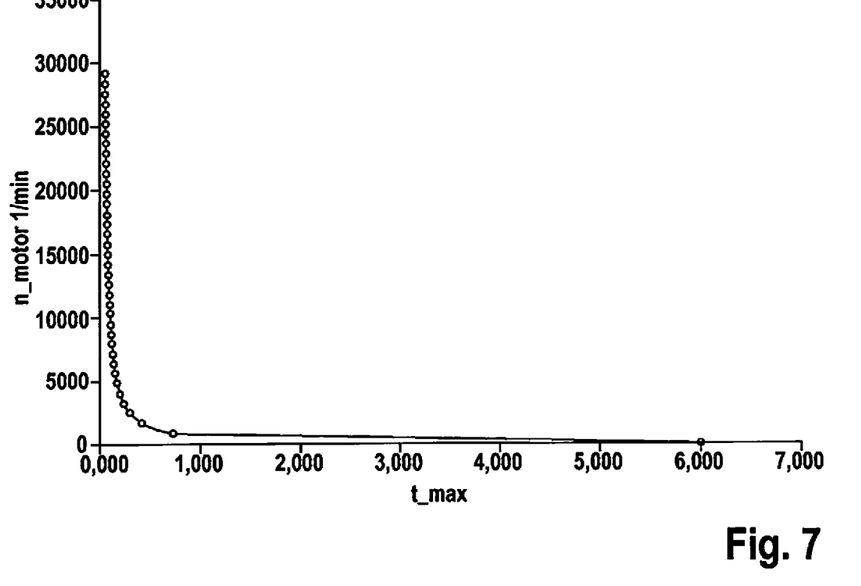
FIG. 7 shows an illustration of a nonlinear temporal relationship between motor speed n and maximum permissible time tmax.

The required time, in which a predetermined number of signal changes 341, 342, 343 may occur between first control signal 351 and second control signal 352 during the slippage, is for the presence of actual slippage. In addition, control unit 370 is configured to determine minimum permissible time tmin or maximum permissible time tmax as a function of motor speed n. In general, permissible time t is derived from motor speed n and the distance from one stop notch 231 to the next stop notch 231. In this context, it has been shown that it is useful for minimum permissible time tmin to cover a range of three stop notches 231. In this manner, a linear relationship between motor speed n and minimum permissible time tmin is derived, as depicted in FIG. 6.

However, generally, motor speed n during operation may not be determined up to 100 percent correctly, which means that a safety allowance should be added to permissible time tmin;
experience having shown that it is advantageous for the number of stop notches 231 over entire motor speed range n to be as small as possible. On this basis, maximum permissible time tmax may be determined according to the following formula:

$$tmax = a*b*I\_Notch\_speed x/n\_motor$$

where:
a=number of stop notches 231 up to controlling, in particular, switching off, the drive motor;
b=number of stop notches 231 on ring gear 206;
I_Notch_Speed=gear ratio of drive motor 180 with respect to an individual stop notch 231, in the case of a locked drive shaft; and
x=gear speed.

In this manner, the number of stop notches 231 may be fixed beforehand, so that a constant permissible angle of rotation for the time measurement occurs in the drilling position. In addition, in this manner, a nonlinear relationship between motor speed n and minimum permissible time tmin or maximum permissible time tmax may be taken as a basis.

In general, it should be noted that both the shape of coupling component 230 and the form of pressure elements 236 or of sensor 310 are shown merely by way of example and are not used to limit the present invention. On the contrary, the form of coupling component 230 may be implemented in any way desired; the deciding factor being that an optimum connection between coupling component 230 and pressure elements 236, as well as an optimum interaction with sensor 310 and control unit 370, are ensured.

Apart from the specific embodiments described and illustrated, additional specific embodiments of the present invention are possible, which may include further modifications and combinations of features.

What is claimed is:

1. A handheld power tool, comprising:
a torque coupling and a gear unit for transmitting a torque generated by a drive motor to a drive shaft, the torque coupling being constructed in such a manner, that in response to slippage of the torque coupling, a coupling component follows a displacement path;
a control unit and a sensor, the sensor monitoring the coupling component for a displacement and transmitting corresponding sensor signals to the control unit, the control unit being configured to control the drive motor as a function of the sensor signals received,
wherein the control unit is configured to subject the sensor signals received to a plausibility check, to determine if actual slippage of the torque coupling is occurring,
wherein the control unit assigns one of a first control signal, which represents a lack of movement of the coupling component, or a second control signal, which represents a movement of the coupling component, to the sensor signals,
wherein the control unit is configured in such a manner, that in the event of an n-time change between the first control signal and the second control signal within a maximum permissible time determined beforehand, the control unit detects a first condition for actual slippage of the torque coupling, wherein n≥2.

2. The handheld power tool as recited in claim 1, wherein n≥3.

3. The handheld power tool as recited in claim 1, wherein in response to an n-time change between the first control signal and the second control signal within a minimum permissible time determined beforehand, the control unit detects a second condition for actual slippage of the torque coupling, wherein n≥2.

4. The handheld power tool as recited in claim 3, wherein $n \geq 3$.

5. The handheld power tool as recited in claim 1, wherein the control unit detects actual slippage of the torque coupling, if at least one of the first condition and the second condition for actual slippage of the torque coupling are satisfied.

6. The handheld power toot as recited in claim 1, wherein the control unit is configured to switch off the drive motor as soon as the control unit detects actual slippage of the torque coupling.

7. The handheld power tool as recited in claim 3, wherein the control unit is configured to determine the minimum permissible time or the maximum permissible time as a function of a motor speed.

8. The handheld power tool as recited in claim 7, wherein a linear relationship between the engine speed and one of the minimum permissible time or the maximum permissible time is taken as a basis.

9. The handheld power tool as recited in claim 7, wherein a nonlinear relationship between the engine speed and one of the minimum permissible time or the maximum permissible time is taken as a basis.

10. The handheld power tool as recited in claim 3, wherein the maximum permissible time (tmax) is determined according to the following formula: tmax=a*6I_Notch_speedx/n_motor; where a=a number of stop notches up to switching off the drive motor; I_Notch_Speed=a gear ratio of the drive motor in the event of a blocked drive shaft; and x=gear unit speed.

11. The handheld power tool as recited in claim 3, wherein the control unit includes a time generator; in response to a first signal change, the time generator emitting a start signal and starting a time measurement; and the control unit stopping the time measurement if two further signal changes are not detected within the maximum permissible time.

12. The handheld power tool as recited in claim 11, wherein the time generator starts a new time measurement in response to each signal change, the control unit monitoring each time measurement separately with regard to whether two further signal changes occur within, in each instance, the maximum permissible time.

13. The handheld power tool as recited in claim 3, wherein the handheld power tool includes a further sensor for detecting a gear speed.

14. The handheld power tool as recited in claim 13, wherein the control unit is configured to determine one of the minimum permissible time or the maximum permissible time as a function of the motor speed and the gear speed.

15. The handheld power tool as recited in claim 13, wherein values set for one of the minimum permissible time or the maximum permissible time are stored in the control unit as a function of the motor speed and the gear speed.

* * * * *